US011695794B2

(12) United States Patent
Cohen et al.

(10) Patent No.: US 11,695,794 B2
(45) Date of Patent: Jul. 4, 2023

(54) METHOD AND SYSTEM FOR CLUSTERING DARKNET TRAFFIC STREAMS WITH WORD EMBEDDINGS

(71) Applicant: DEUTSCHE TELEKOM AG, Bonn (DE)

(72) Inventors: Dvir Cohen, Efrat (IL); Asaf Shabtai, Hulda (IL); Yuval Elovici, Arugot (IL); Yisroel Avraham Mirsky, Beer Sheva (IL); Rami Puzis, Ashdod (IL); Tobias Martin, Darmstadt (DE); Manuel Kamp, Darmstadt (DE)

(73) Assignee: DEUTSCHE TELEKOM AG, Bonn (DE)

( * ) Notice: Subject to any disclaimer, the term of this patent is extended or adjusted under 35 U.S.C. 154(b) by 333 days.

(21) Appl. No.: 16/838,136

(22) Filed: Apr. 2, 2020

(65) Prior Publication Data
US 2020/0322368 A1 Oct. 8, 2020

Related U.S. Application Data

(60) Provisional application No. 62/828,528, filed on Apr. 3, 2019.

(51) Int. Cl.
*G06F 11/30* (2006.01)
*H04L 9/40* (2022.01)
(Continued)

(52) U.S. Cl.
CPC ...... *H04L 63/1433* (2013.01); *G06F 11/3072* (2013.01); *G06F 18/23* (2023.01);
(Continued)

(58) Field of Classification Search
CPC .................................................. G06F 9/6218
See application file for complete search history.

(56) References Cited

U.S. PATENT DOCUMENTS

2019/0044964 A1 2/2019 Chari et al.
2020/0244683 A1* 7/2020 Meshi ................. H04L 63/1425

FOREIGN PATENT DOCUMENTS

EP 3355547 A1 8/2018

OTHER PUBLICATIONS

European Search Report for Application No. EP20167836, dated Jul. 3, 2020, 3 pages.
(Continued)

*Primary Examiner* — Charlie Sun
(74) *Attorney, Agent, or Firm* — Hoffman Warnick LLC

(57) ABSTRACT

A system for analyzing and clustering darknet traffic streams with word embeddings, comprising a data processing module which collects packets that are sent to non-existing IP addresses that belong to darknet's taps (blackholes) that are deployed over the internet: a port embedding module for performing port sequence embeddings by using a word embedding algorithm on the port sequences extracted from the data processing module while transforming the port sequences into a meaningful numerical feature vectors: a clustering module for performing temporal clustering of the feature vectors over time; and an alert logic and visualization module visualizes the data and provides alerts regarding a cluster that an analyst classified as malicious in the past.

11 Claims, 12 Drawing Sheets

(51) Int. Cl.
  *G06N 3/04*  (2023.01)
  *G06F 18/23*  (2023.01)
(52) U.S. Cl.
  CPC ........... *G06N 3/04* (2013.01); *H04L 63/1416* (2013.01); *H04L 63/1425* (2013.01)

(56) References Cited

OTHER PUBLICATIONS

Ban et al., "Towards Eady Detection of Novel Attack Patterns through the Lens of a Large-Scale Darknet," 2016 Intl IEEE Conferences on Ubiquitous Intelligence & Computing, Advanced and Trusted Computing, Scalable Computing and Communications, Cloud and Big Data Computing, Internet of People, and Smart World Congress, IEEE Computer Society, Jul. 18, 2016, pp. 341-349.

Yizheng et al., "Practical Attacks Against Graph-based Clustering," Association for Computing Machinery, Cornell University, Aug. 30, 2017, p. 18.

\* cited by examiner

METHOD AND SYSTEM FOR CLUSTERING DARKNET TRAFFIC STREAMS WITH WORD EMBEDDINGS

FIELD OF THE INVENTION

The present invention relates to the field of cyber security. More particularly, the invention relates to a method and system for analyzing and clustering darknet traffic streams with word embeddings.

BACKGROUND OF THE INVENTION

A darknet [33] (also known as a network telescope or blackhole—is a routed allocation of IP address space that is not discoverable by any usual means. The term is used to refer to both a single private network and the collective portion of Internet address space that has been configured in that manner) consists of unassigned IP addresses that are used by ISPs to analyze incoming network traffic and derive meaningful and actionable insights [1, 2]. Similar to honeypots [9, 31], darknet IP addresses are not associated with any registered host or services, and thus any incoming packets can be considered unwanted and non-productive.

Packets sent to IP addresses that are part of a darknet are usually the result of network probing/scanning, worm propagation, a DDOS attack, or network misconfiguration, thereby causing legitimate hosts to direct their data to the darknet [38, 45].

Darknet data can be used for inferring threat intelligence related to ongoing malicious activities or new emerging attacks [34]. The main advantage of using a darknet as a sensor for collecting and analyzing network traffic is that it can easily be deployed, it is inexpensive to implement, and can collect a significant amounts of data. However, analyzing darknet data and inferring meaningful insights are challenging tasks. This is because of the following three main reasons:

First, unlike honeypots, which usually emulate real services (e.g., a Web application or SSH server) and therefore can interact with hosts that have initiated communication, darknet IP addresses are not assigned to a host and therefore cannot reply to any incoming packets. As a result, the available data for analysis is minimal and includes mainly the metadata of incoming packets (information extracted from the incoming packet's header, such as source IP (S-IP), destination IP (D-IP), destination port (D-port), and packet size).

Second, much of the host mapping (scanning) activity on the Internet is performed by legitimate services/enterprises (e.g., Amazon, Google, and Shodan) [18]. Such activity may have similar patterns to real malicious activities, and any efficient analysis method should be able to differentiate a benign activity from malicious activity.

Third, in many cases, attackers reuse known attack pattern (sometimes with minor changes); the analysis method should be able to identify a reoccurring attack, as well as novel attacks.

There are various methods for analyzing darknet traffic. Since the destination TCP or UDP port number provides a good indication of the sender's intentions (e.g., accessing port 23 may indicate an attempt to search for an accessible Telnet server), most of the previous research has focused on grouping ports into static clusters and detecting peaks or unusual trends in the volume of the clusters or individual ports [5, 8, 22, 37]. However, as attacks are becoming more sophisticated and automated (e.g., performing multistage attacks [14] or attempting to exploit multiple vulnerabilities [39]), the ability of such methods to detect emerging attacks is limited. Consequently, in order to provide an effective analysis method for darknet data, the sequence of ports accessed by individual IP addresses should be analyzed.

In order to detect an attack, it is important for a security analyst to be able to analyze darknet data and provide insights on an hourly basis. However, this analysis is challenging as there are terabytes of darknet traffic data every month and this figure is expected to increase in the coming years. A solution to this challenge should be based on utilizing the power of big data and using a distributed algorithm to provide hourly reports and alerts.

Mining Darknet Traffic

In prior research [1-3, 5, 6, 8, 13, 22, 24, 29, 38, 47], darknet data is used to detect botnet hosts, typically by clustering and classifying the S-IPs with features such as the destination port (D-port) and packet size.

Reference [29] proposes a rule-based model to help categorize darknet records into several types of malicious attacks and benign activities, and showed how those categories evolved over ten years of data. Attributes such as the number of source IPs and destination ports are used in order to categorize the data. However, the sequence of destination ports coming from an IP has not been considered Those sequences was found to be particularly informative in the detection of attack patterns as they can indicate the intention of the attacker.

Ban et al. [3-6, 24] introduced a Network Incident Analysis Center For Tactical Emergency Response (NICTER) that monitors around 300,000 blackhole IPs in Japan. Ban et al. used NICTER to find correlations between the malicious activities discovered on the darknet and activities extracted from different types of honeypots. In [3], and later in [4], Ban et al. used DT-growth, an Association Rule Learning (ARL) algorithm, in order to find associations with ports in the Darknet data. Ban et al. showed that many attacks patterns use more than one port and thus should be grouped.

Thonnard and Dacier [40] proposed a new clustering tool to detect groups of IPs that behave similarly. Thonnard and Dacier used graph theory in order to find temporal correlation between port usage and thus created a way to group different IPs. However, this clustering tool ignored the meaning and use of the ports in the sequence, while clustering.

In [16], DBSCAN has been used to create clusters of packets, while applying an algorithm from the field of topological data analysis in order to visualize the darknet and help an expert easily observe and analyze the data. To use DBSCAN, the ports were treated as integers by looking at the port number.

In order to retrieve numeric information from network traffic packets, many prior art techniques extracted statistical features such as the number of destination IPs or unique ports [7, 12, 15, 16, 28, 36, 38, 46]. Although these features help in the detection and exploration of attacks, they are hand-picked, and it is difficult to choose the features that fit the task. Most of the aforementioned prior art techniques apply their method on a static corpus of data. However, new data arrives continuously, and there is a need for an online system that can detect attacks in near real-time.

Clustering algorithms, such as k-means and DBSCAN [21], are batch algorithms that are applied once on the entire dataset and cannot track or monitor temporal trends. Although batch algorithms provide the best clustering quality, they are unsuitable as-is for processing data streams (unbounded sequences of observations). To cluster data streams, STREAM [25], Incremental DBSCAN [20], DenStream [10], CluStream, and many others [11] may be used. However, these algorithms cannot perform novelty detection since they cannot differentiate between reoccurring clusters and novel clusters. This capability is required to detect emerging threats and monitor the re-use of known attack variants.

There are several algorithms for novelty detection in data streams [23], however these algorithms cannot be natively parallelized over a big data computing cluster and do not directly support the processing of multiple parallel sources. Furthermore, each of these algorithms was designed to apply the principles of a particular kind of clustering algorithm (e.g., k-means) over compressed data summaries. This is a lossy process, and a user may need a different type of clustering algorithm to best fit the data.

In contrast, the temporal clustering framework that the present invention proposes can be parallelized over a big data cluster while receiving data from multiple sources. In addition, the framework is flexible in terms of selecting a clustering algorithm. This enables the user to apply the most suitable batch algorithm in his/her arsenal.

It is therefore an object of the present invention to provide a method and an effective framework for analyzing darknet traffic which is both scalable and near real-time, and can detect the reoccurrence of previously observed complex attacks as well as novel attack patterns which were not encountered before.

It is another object of the present invention to provide a method for representing sequences of accessed ports (of variable length) as numerical feature vectors (embeddings) which capture the patterns in a meaningful way.

It is a further object of the present invention to provide an algorithm for performing temporal clustering which can track cluster drift, and detect novel/emerging clusters and reoccurring clusters.

It is yet another object of the present invention to provide a method for performing temporal clustering, which runs parallelized over a big data cluster with multiple data sources.

It is still another object of the present invention to provide a method and an effective framework for analyzing data traffic collected by honeypots, which is both scalable and near real-time, and can detect the reoccurrence of previously observed complex attacks as well as novel attack patterns which were not encountered before.

It is another object of the present invention to provide a method and framework for mining darknet traffic, in order to track and discover emerging threats.

Other objects and advantages of the invention will become apparent as the description proceeds.

SUMMARY OF THE INVENTION

A method for analyzing and clustering darknet traffic streams with word embeddings, comprising the steps of:
a) collecting data from blackhole taps of the darknet, being unassigned IP addresses;
b) splitting the collected data into sliding time windows, each having a predetermined length;
c) For each time window, grouping the destination port (D-port) records of the same source IP (S-IP) into a port sequence, to obtain a plurality of port sequences;
d) transforming the port sequences into a numerical feature vectors by applying a word embedding algorithm (such as Word2vec) to the port sequences, by treating ports as words and port sequences as sentences;
e) clustering the feature vectors over time by performing temporal clustering; and
f) upon identifying clusters that have been appeared and classified as malicious in the past or clusters that have never seen before, issuing an alert.

Temporal clustering may be parallelized over a big data cluster while receiving data from multiple sources.

Temporal clustering may be performed by examining the D-Ports of packets arriving to the darknet, such that IPs with similar D-ports activities, both in terms of time and ports numbers, create a pattern that represent a new attack.

In one aspect, a sequence from a specific S-IP corresponds to a sentence, and the port numbers correspond to the words in the sentence.

Sequences of ports may be summarized as their average embedding and analyzing their behavior by performing cluster analysis and inspecting the clusters over time.

Splitting the collected data into sliding time windows may be performed by sorting and aggregating the most recent data into overlapping time windows, such that there will be overlap between neighboring, in order to track clusters.

Clustering may be applied to the data of each time window using DBSCAN.

Categories of clusters may be selected from the group of:
Port Scanning Clusters that consist of five or more different ports;
Network Scanning Clusters that consist of S-IPs trying to access a single destination port;
Multiple Port Sequence being Clusters with more than one port but less than five, which can indicate a complex attack pattern;
Noise and Outliers being a single cluster, with patterns that belong to a misconfiguration or backscatters, or are too small to represent an ongoing trend.

The darknet may be implemented by a collection of honeypots that are deployed over that data network.

A system for analyzing and clustering darknet traffic streams with word embeddings, which comprises:
a) a data processing module which collects packets that are sent to non-existing IP addresses that belong to darknet's taps (blackholes) that are deployed over the internet;
b) a port embedding module for performing port sequence embeddings by using a word embedding algorithm on the port sequences extracted from the data processing module while transforming the port sequences into a meaningful numerical feature vectors;
c) a clustering module for performing temporal clustering of the feature vectors over time; and
d) an alert logic and visualization module visualizes the data and provides alerts regarding a cluster that an analyst classified as malicious in the past.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE INVENTION

The present invention proposes DArkNet Traffic Embedding (DANTE) method, which a novel darknet analysis method for detecting new emerging (potential) threats via darknet traffic analysis, by considering the sequence of ports being targeted. DANTE includes two key components. The first applies the Word2vec [32] technique on sequences of accessed ports in order to find a numeric representation (embedding) that captures the source IP's unique activity. The second component introduces a novel temporal clustering technique which enables tracking and detection of malicious activities observed in the darknet network traffic, and the discovery and analysis of new trends. The method is designed to be scalable and operate in a big data architecture, in order to handle the large amount of data.

The method proposed by the present invention uses a temporal clustering framework that can be parallelized over a big data cluster while receiving data from multiple sources. In addition, the framework is flexible in terms of selecting a clustering algorithm. This enables the user to apply the most suitable batch algorithm.

The present invention uses an artificial neural network to learn the connections and relations between the ports to find an informative numeric representation. The neural network-based algorithm automatically extracts meaningful representations of the packets.

In order to detect attacks in near real-time, the proposed method periodically analyzes the packets that have arrived from the sensor in the last L minutes and applies the detection mechanism in an online fashion by using big data architectures.

The proposed framework and algorithm are used for mining darknet traffic in order to track and discover emerging threats. During an attack, packets are sent to set of ports on a device in order to exploit vulnerability. By using Word2vec, DANTE learns the meaning of each port in this context, and is able to represent the activity (recent targeted ports) of an attacking device as single embedding which captures the attacker's intent. DANTE represents each device access by its embedding, and applies a novel time series clustering procedure to track patterns and detect new emerging threats. Using these methods, DANTE is able to produce frequent reports over massive amounts of data. DANTE is evaluated on ~100 days of darknet traffic collected by a large network service provider. The results show that DANTE is able to track malicious campaigns and discover new emerging threats.

Figure 1:
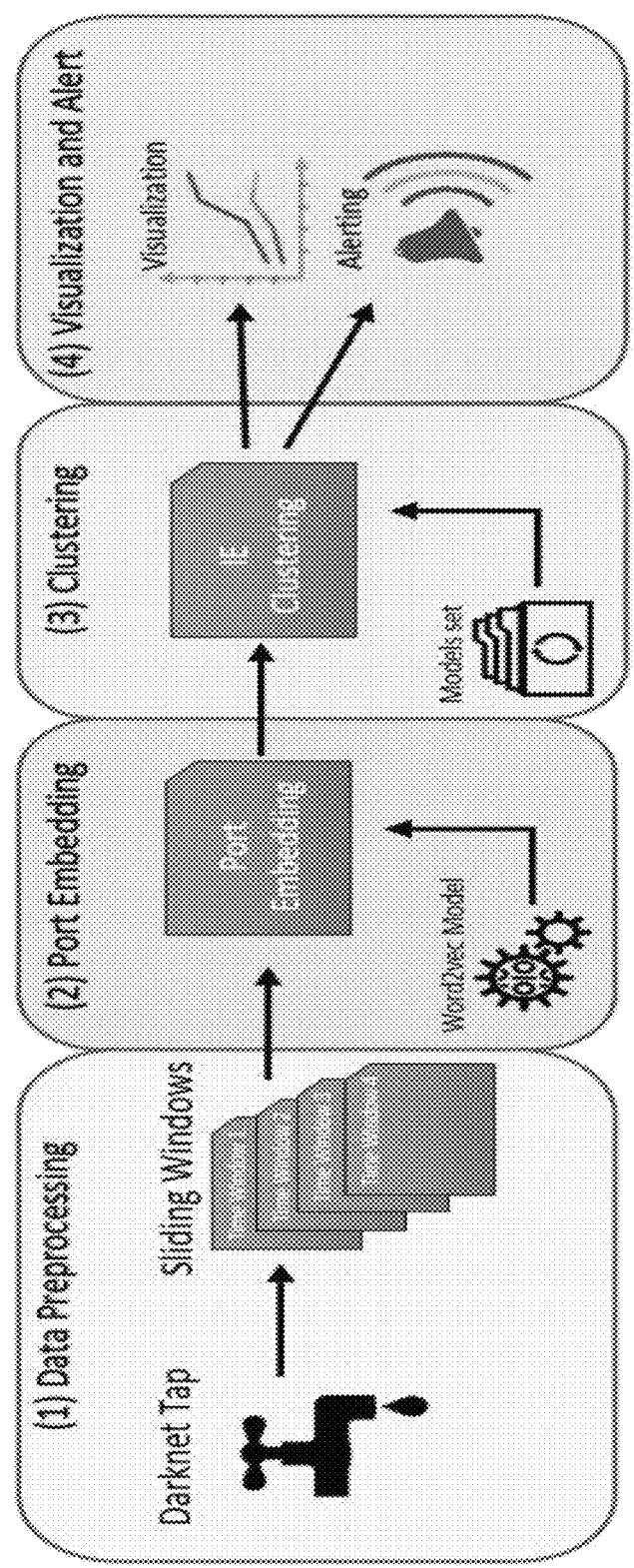
FIG. 1 illustrates a schematic view of the proposed DANTE framework.

FIG. 1 illustrates a schematic view of the proposed DANTE framework. The framework comprises a data processing module which collects packets that are sent to non-existing IP addresses that belong to darknet's taps (blackholes) that are deployed over the internet. A port embedding module performs port sequence embeddings by using a word embedding algorithm on the port sequences extracted from the data processing module while transforming the port sequences into a meaningful numerical feature vectors. A clustering module performs temporal clustering of the feature vectors over time. An alert logic and visualization module visualizes the data and provides alerts regarding a cluster that an analyst classified as malicious in the past.

The Darknet Analyzer Framework

The present invention models the ongoing activities in the darknet by examining the D-Ports of packets arriving to the darknet and cluster them into groups. This approach stems from the idea that IPs with similar D-ports activities, both in terms of time and ports numbers, create a pattern. Those patterns can be used to discover new attacks, as well as explore the behavior of ongoing attacks and trends.

The analysis process consists of the four stages described below:

Stage 1—Sequence Extraction

Figure 2:
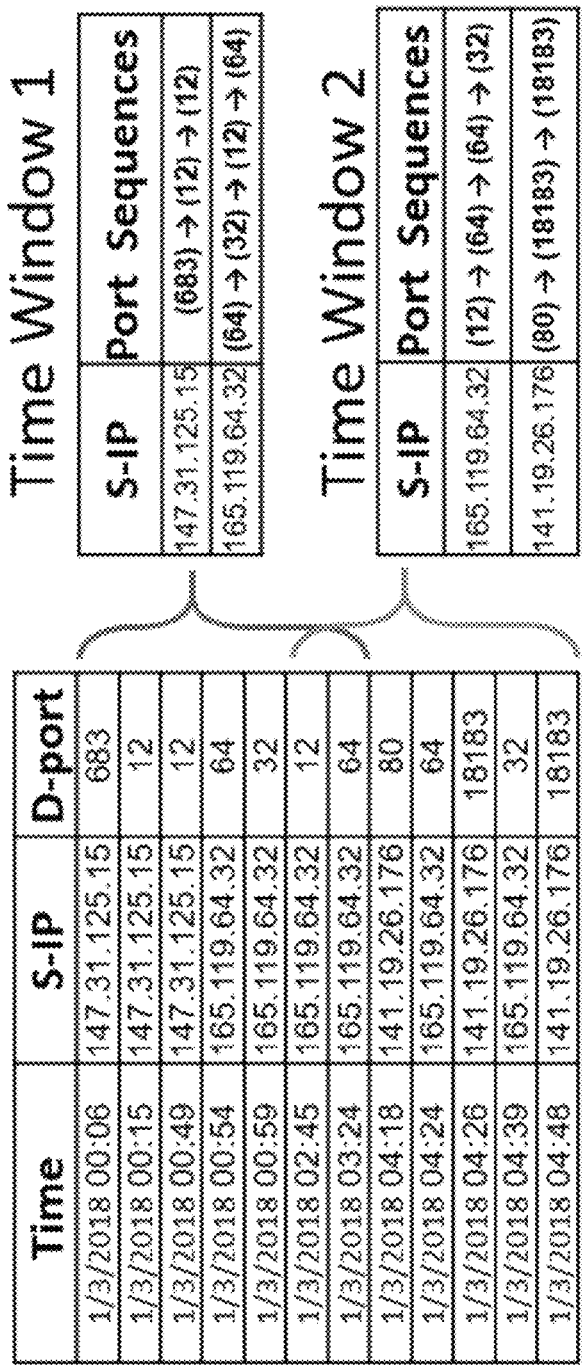
FIG. 2 illustrates the time window extraction.

First, the data is split into sliding time windows, resulting in multiple windows with length L. For each time window, the destination port (D-port) records of the same S-IP are grouped into a port sequence. The final result is a table representing a time window with two attributes, the first being the S-IP, and the second being the D-port's sequence, as shown in FIG. 2.

Stage 2—Port Sequence Embeddings

By using a word embedding algorithm on the port sequences extracted from the previous stage and treating ports as words and port sequence as sentences, one can transform the port sequences into a meaningful numerical feature vectors.

Stage 3—Temporal Clustering

With the feature vector obtained in the previous stage, the present invention uses a novel temporal clustering method to cluster the feature vectors over time. This step allows us to get the right cluster IDs in the overall temporal space as well as find if those clusters have appeared in the past.

Stage 4—Alert Logic and Visualization

Once there is the current cluster names of each time window, it is possible use this data to visualize it in order to allow data analysis. It is possible also use this information to create an alert rule, e.g., an alert regarding the reappearance of a cluster that an analyst classified as malicious in the past. This kind of alert can be used in malware information sharing platforms such as MISP [43].

In addition, the above-mentioned alert system will enable to use DANTE to handle adversarial attacks. Such attacks can be divided into two types. In the first type, the attacker is trying to conceal himself by adding dummy port access as noise. A simple way to deal with this attack group is to include an alert rule that issues alert when a cluster that has never seen before is seen, as those attacks will create a new cluster. In the second type, the attacker will try to disguise himself as a pattern that belongs to a known cluster, such as a cluster that consists of a popular port sequence pattern. To deal with this type, it is possible to create an alert rule to issue an alert when a cluster dramatically increases in size. Another way to deal with this group of attacks is to recluster the large clusters and find sub-patterns within them. Those clusters could help an analyst find malicious subpatterns that differ from the other subclusters and those can indicate hidden attempts.

Port Sequence Embedding

Threat agents (e.g., an attacker or bot) may send packets to unregistered IP addresses for several different reasons, such as to find a host with a vulnerability to exploit or, in the case of worms, to access a backdoor. A sequence S is defined as the sequence of ports collected from a specific S-IP to a specific D-IP. A darknet sensor can identify these communications as a sequence of ports being accessed. For example, the sequence "42527;80;80" was observed in the wild. In this sequence, it is possible to see that the attacker tried to access a high port (42527), and immediately send several packets to port 80 (HTTP). This can reflect an attacker's intent to exploit a backdoor on port 42527, and then gain access to a web system on port 80. From this data, it is possible to understand that the port targets in a given sequence reveal information regarding the intent of the attacker.

Moreover, by clustering the sequences, it is possible to determine whether or not the behavior is novel and can be considered an emerging threat. However, in order to cluster those sequences, a representation which can summarize them as a numeric vector for the machine learning algorithm must be found. Although TCP and UDP ports are numbers, the numerical relationship between ports is meaningless. For example, port 21 is used for FTP, and port 22 is used for SSH, and there is no connection between the two. Therefore, in order to summarize the behavior of a scan, a numeric relationship between all of the ports first should be learned.

One way to obtain a numerical representation for each port is to use Word2vec. Word2vec, presented in [32] by Mikolov et al., which is a Natural Language Processing (NLP) algorithm that aims to maximize the co-occurrence probability of words in the same sentence. The method proposed by the present invention uses the same basic algorithm, but instead of looking at words in sentences, it uses the port sequences where a sequence from a specific S-IP corresponds to a sentence, and the port numbers correspond to the words in that sentence. By using Word2vec, two different ports that use the same service are likely to have quite a similar vector representation as those ports will appear in similar port scans, without the need to explicitly tell the algorithm the usage of each port.

An example of that property can be seen by looking at port 23 and port 2323, both of which are used for Telnet and hence are expected to appear in the scan data interchangeably. Therefore, they will have remarkably similar embedding vectors. By using Word2vec, there is no need to consider the fact that multiple ports use the same service as the embedding does. In addition, Word2vec can find a relation between ports with unknown services behind them, as it does not require any a-priori knowledge about the ports and detects the relations based only on by their appearance in the data. In order to build this port-to-embedding transformation model, it needs to be supplied with a significant amount of scan data, which could be computationally heavy. Fortunately, this model does not have to be rebuilt in every time window and it is possible to use a pretrained model for a long period of time.

The intuition behind this rationale is that the uses of each port do not change often and a well-trained model should be sufficient for a considerable amount of time. In addition, there is no need to save the model itself once trained. Instead of keeping the model, it is possible to save a hash table where the key is the port number, and the value is the embedding. This approach reduces the amount of data needed to be saved significantly, as the number of possible ports is limited by the number 65,536.

After each port has an embedding vector of size d, there is a need to obtain an embedding vector with the same size, d, that represents an entire port sequence P that contains s number of ports. Although there are many methods for sentence embedding, recent research [44] discovered that the best way to do so is to average the embedding of each word in the sentence. In the port embeddings case, the list of embedding vectors is been averaged as follows:

Let $$[P_i^1; P_i^2; \ldots ; P_i^d]$$

be the embedding of the i'th port in the port scan P, then:

$$\text{scan\_embedding} = \left[\frac{\sum_{j=1}^{S} P_j^1}{S}, \frac{\sum_{j=1}^{S} P_j^2}{S}, \ldots, \frac{\sum_{j=1}^{S} P_j^d}{S}\right]$$

The resulting feature vector can be used for any machine learning algorithm, such as a classifier or clustering algorithm.

Temporal Clustering

As described, it is possible to summarize sequences of ports as their average embedding and analyze their behavior by performing cluster analysis. However, it is important to inspect the clusters over time. By doing so it is possible to perform the following tasks:

(1) detect new attacks as they emerge (novelty detection);
(2) track attack campaigns and how their strategies change;
(3) follow the re-use of known attacks, e.g., variants of the Mirai botnet;
(4) analyze the trend of ongoing attacks, such as changes in volume, sources, and targets. However, darknet data is collected from X sources simultaneously. Therefore, the data is typically stored in a big data cluster such as Hadoop. The present invention proposes a temporal clustering framework which can be used with any batch clustering algorithm.

The framework operates as follows:

Windowing

At the first step, the most recent data is sorted and aggregated into overlapping time windows. If L is the width of the window in minutes, and let S be the step size in which the window is being slide, where S<L. Following this process, let $T_i$ be the i-th time window in the data, where $T_{i+1}$ is the next sequential time window. Finally, let the ratio of observations shared between two neighboring windows be defined as:

$$r_{i,i+1} \frac{|T_i| \cap |T_{i+1}|}{L}$$

The overlap between neighboring windows is necessary in order to track clusters. To ensure this, the parameter S should be small enough so that $0.2 \leq r_{i,i+1} \leq 0.8$.

Clustering

At the next step, a clustering algorithm is applied to the data of each time window to group the observations, while any batch clustering algorithm can be used. For example:

K-means, Fuzzy C-means, Gaussian mixture models, hierarchical clustering, spectral clustering and more. For the dataset used by the present invention, it was found that the clustering algorithm, DBSCAN [20], worked best. The reason is because DBSCAN clusters data is based on density. As a result, the number of clusters discovered varies and does not need to be predefined (as in k-means). Another advantage is that DBSCAN can label outliers (points which are relatively far from the general distribution). This helps to analyze these cases separately without harming the quality of the clustering process.

Mapping

Figure 3:
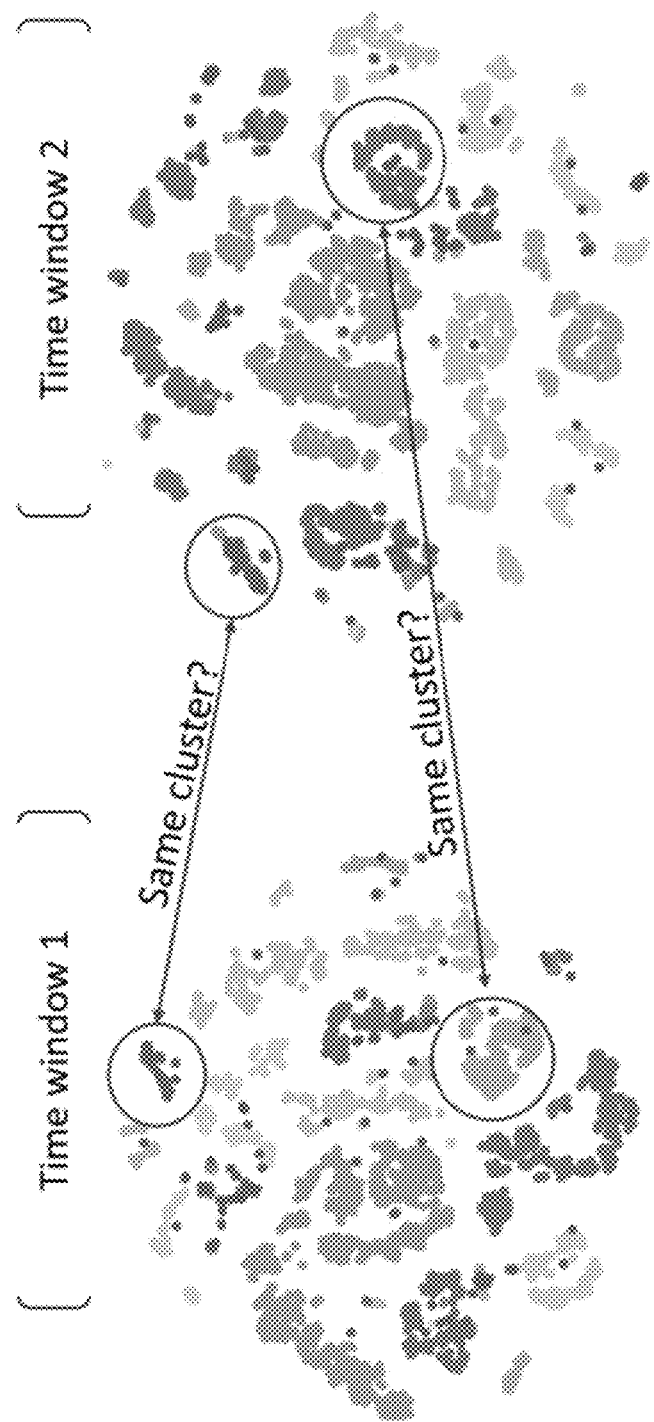
FIG. 3 is an illustration of the challenge in mapping clusters found in different time windows.

Between time window $T_i$ and time window $T_{i+1}$, the number of clusters and their types can change. Moreover, a cluster in $T_{i+1}$ can be a current cluster (also found in $T_i$), an old cluster (found in $T_j$ where $j<i$), or a new cluster (never seen before). FIG. 3 illustrates the challenge of mapping clusters found in different time windows.

To annotate the clusters in $T_{i+1}$, first there is a need to find the current clusters by comparing $T_i$ and $T_{i+1}$. A cluster in $T_{i+1}$ is mapped to a cluster in $T_i$ if there is a significant overlap of observations between them. The overlap is been measured using the Jaccard similarity metric (a percentage of how many objects two sets have in common out of how many objects they have total), defined as:

$$\text{Jaccard}(A, B) = \frac{|A \cap B|}{|A \cup B|} = \frac{|A \cap B|}{|A| + |B| - |A \cap B|}$$

The Jaccard similarity metric measures the similarity between sets of items. This metric can be used in that case, because adjacent time windows overlap (by L-S). As a result, clusters which have a high Jaccard Similarity Score have a large number of overlapping observations and thus are considered to be the same pattern. By using the distributed system, the Jaccard similarity of all of the clusters in $T_{i+1}$ with the clusters in $T_i$ is simultaneously calculated. If the Jaccard similarity is above a certain threshold for two clusters, then the cluster from $T_{i+1}$ is considered to be the same as the cluster from $T_i$ (i.e., current cluster). In cases in which the $T_{i+1}$ cluster has no corresponding cluster from $T_i$, the cluster is considered new. The algorithm for mapping clusters between adjacent overlapping time windows is presented in Algorithm 1 below. There is no need to use the embedding vector of each instance; only a key (the S-IP in our case) is needed for the comparison.

---

Algorithm 1: The cluster mapping algorithm
for the current and previous time windows

---

Data: $T_i$, $T_{i+1}$, Threshold
Result: ClusterToClusterMapping
ClusterToClusterMapping ← emptylist
  foreach s ∈ $T_i$ do
  | foreach k ∈ $T_{i+1}$ do
  | | Sim ← Jaccard(s, k) ;
  | | if Sim > Threshold then
  | | | ClusterToClusterMapping[s] ← k ;
  | | |
  | | end
  | end
end

---

The cluster mapping process presented in the previous section enables to align the clusters with the previous day, but there is also a need to be able to identify old clusters that have been seen in the past, as well as detect reoccurring clusters (i.e., clusters that disappear and reappear intermittently). Because storing the entire data is, in most cases, impractical, the approach proposed by the present invention is to build a classifier model for each of the observed clusters. Each model is a binary one-vs-all classifier trained on the time window where the said cluster was first seen. The instances that belong to the cluster get the label one, and the rest get the label zero. It was found that Random Forest suits this problem well as this model, unlike classifiers such as K nearest neighbors, have no need to save the data points and only need to save the decision trees. The set of one-vs-all classifiers was defined as MS.

Let $T_{I,c}$ be a cluster that was unable to be mapped to any of the clusters in the previous time window. In order to determine whether it was seen before, iterations were performed over each of the classifier models, M in MCS, and a prediction probability from model M for each instance I∈$T_{I,c}$ was obtained. The probability of obtaining the label one was then averaged, meaning the probability of being in cluster M. This score is the confidence score C of cluster $T_{I,c}$ to be cluster M. If the confidence score is higher than a specified threshold, the cluster $T_{I,c}$ behaves similarly to cluster M, and so they are considered to be the same cluster (i.e. old cluster). Similarly to the Jaccard similarity calculation, one can easily distribute the prediction part as those predictions can also be calculated simultaneously. A formal description is described in Algorithm 2 below. In cases in which there is no match in any of the classifiers in MCS, cluster $T_{I,c}$ is considered to be a new cluster. Once a new cluster is found a new classifier is been trained on this cluster's data as previously explained. After some time, a concept drift may occur, and the patterns change slightly. To deal with this issue, in cases in which a known cluster appears in the data stream, the corresponding model is updated and retrained.

---

Algorithm 2: The recovery & discovery algorithm
for finding older appearances of a cluster

---

Data: $T_{I,c}$,MSC, Threshold
Result: TrackedCluster
begin
  | N ← NumberOfInstances($T_{I,c}$)
  | TrackedCluster ← emptyString
  | foreach M ∈ MSC do
  | | C ← 0
  | | foreach I ∈ $T_{I,c}$ do
  | | | $P_I$ ← P($Y_i$ = 1|M)
  | | | C ← C + $P_I$
  | | end
  | | $C_{normalized}$ ← C/N
  | | if $C_{normalized}$ > Threshold then
  | | | TrackedCluster ← M.name
  | | end
  | end
end

---

Analysis of Darknet Traffic

In order to demonstrate the capabilities of the proposed DANTE framework, a thorough study was conducted, involving actual darknet data collected from a large Network Service Provider (NSP) for a total period of 14 weeks. The data was collected from a greynet [5, 26], meaning the unused IP are from a network that populated by both active and unused IP addresses.

Configuration and Setup

Dataset: The analyzed dataset consists of network traffic collected from 1,126 different unused IP addresses from 12 different subnets of the NSP network. The traffic was collected in two batches; the first was recorded during a period of six weeks (44 days) from Oct. 25, 2018 until Dec. 5, 2018 (denoted by Batch 1), and the second was recorded during a period of eight weeks (55 days) from Feb. 1, 2019 until Mar. 26, 2019 (denoted by Batch 2). The two batches were analyzed separately.

Figure 6A:
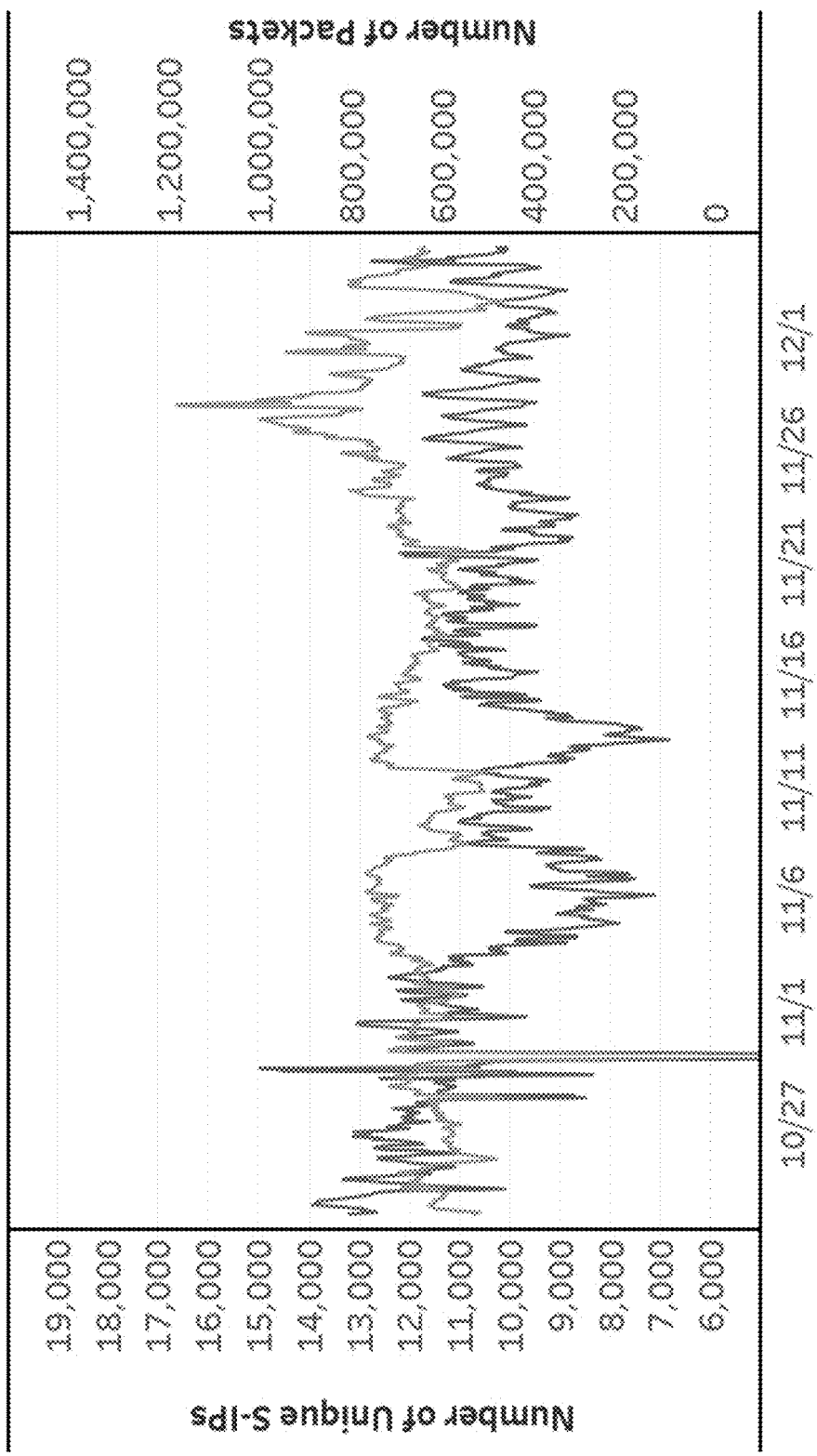
FIGS. 6A and 6B present the hourly number of different packets (orange) unique S-IPs (blue) in the darknet after the data preprocessing stage.
Figure 6B:
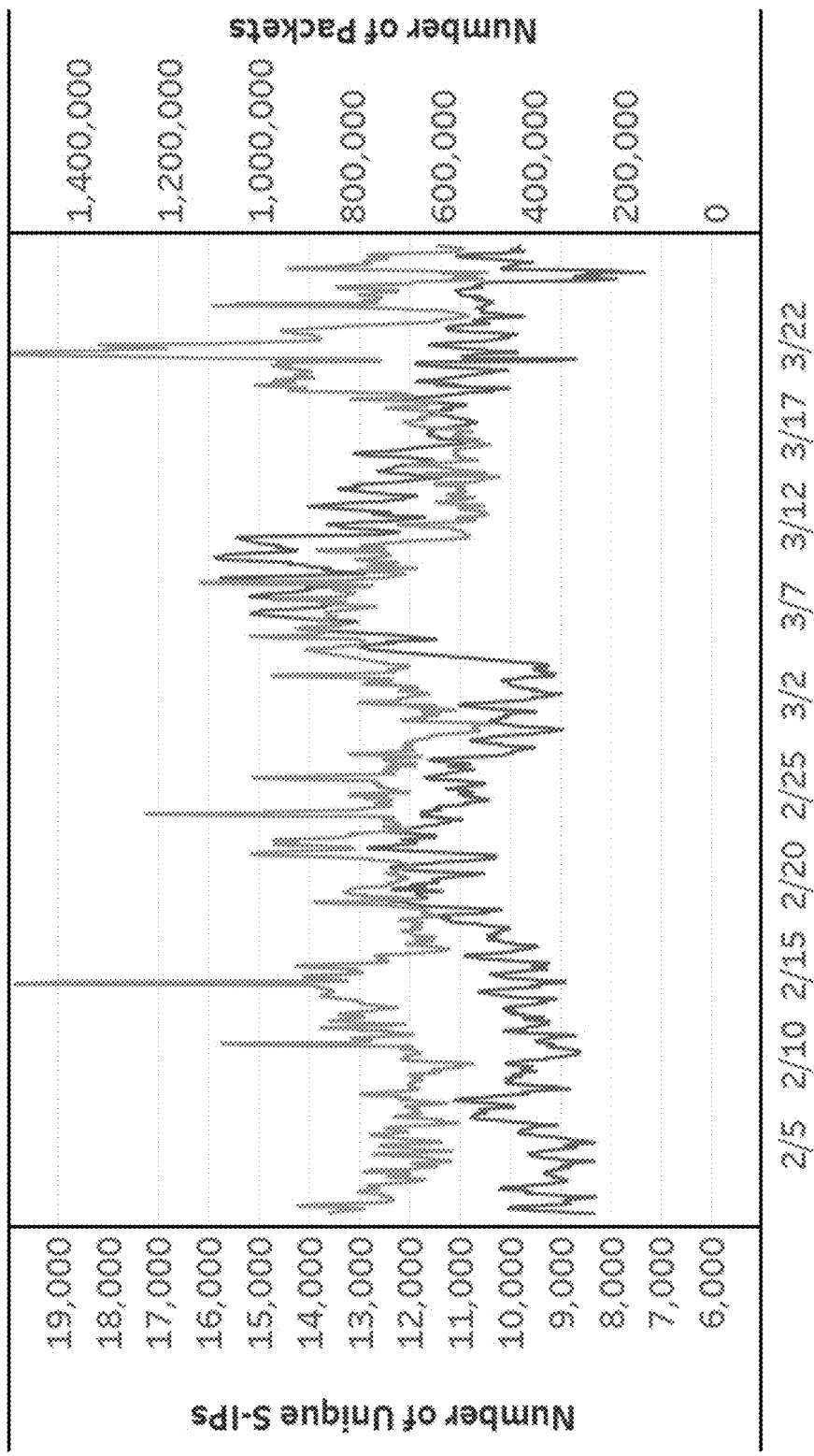

A total of 1,620,918,924 packet headers sent from 1,491,027 different S-IP addresses were recorded. FIG. 6 shows the number of packets and S-IP addresses for every hour in the data. Note that due to a technical problem, one hour at the end of October is missing. Because the missing time is insignificant, and the proposed method can deal with missing time windows, those missing values do not affect the overall results.

Configuration: The step size S is chosen to be one hour and the window length L is chosen to be four hours, similar to the work of Ban et al. [4]. A one hour step size provides a sufficient amount of data while granting a security expert enough time to react to a detected attack. In addition, the epsilon parameter of DB-SCAN is chosen to be 0.3, and the minPts parameter is chosen to be 30, as those parameters resulted in an average of four new clusters every day (agreed by the security experts to be a reasonable number of clusters to investigate each day). In addition, clusters with a small number of SIPs are unwanted, as those clusters are too small to represent a significant trend in the network, and thus should be treated as noise.

Scalable Implementation: In order to build a scalable system, the method was developed using the Spark framework on Hadoop architecture. The method has been tested on a Hadoop cluster consisting of 50 cores and 10 executors. The algorithm takes an average of 62 seconds to process a time window of four hours, including the time window mapping component.

Data Preprocessing: As most of the S-IPs in the dark data only sent one or two packets during the period of data collection, it was decided to remove them as those port sequences associated with those IPs are too short and cannot constitute a meaningful pattern. Filtering those IPs reduces the noise and therefore improves the results. In addition, some of those IPs are likely to be a random miss configuration and not an active malicious attack. By removing those IPs, the number of packets by 33% percent was reduced.

Results

Figure 4A:
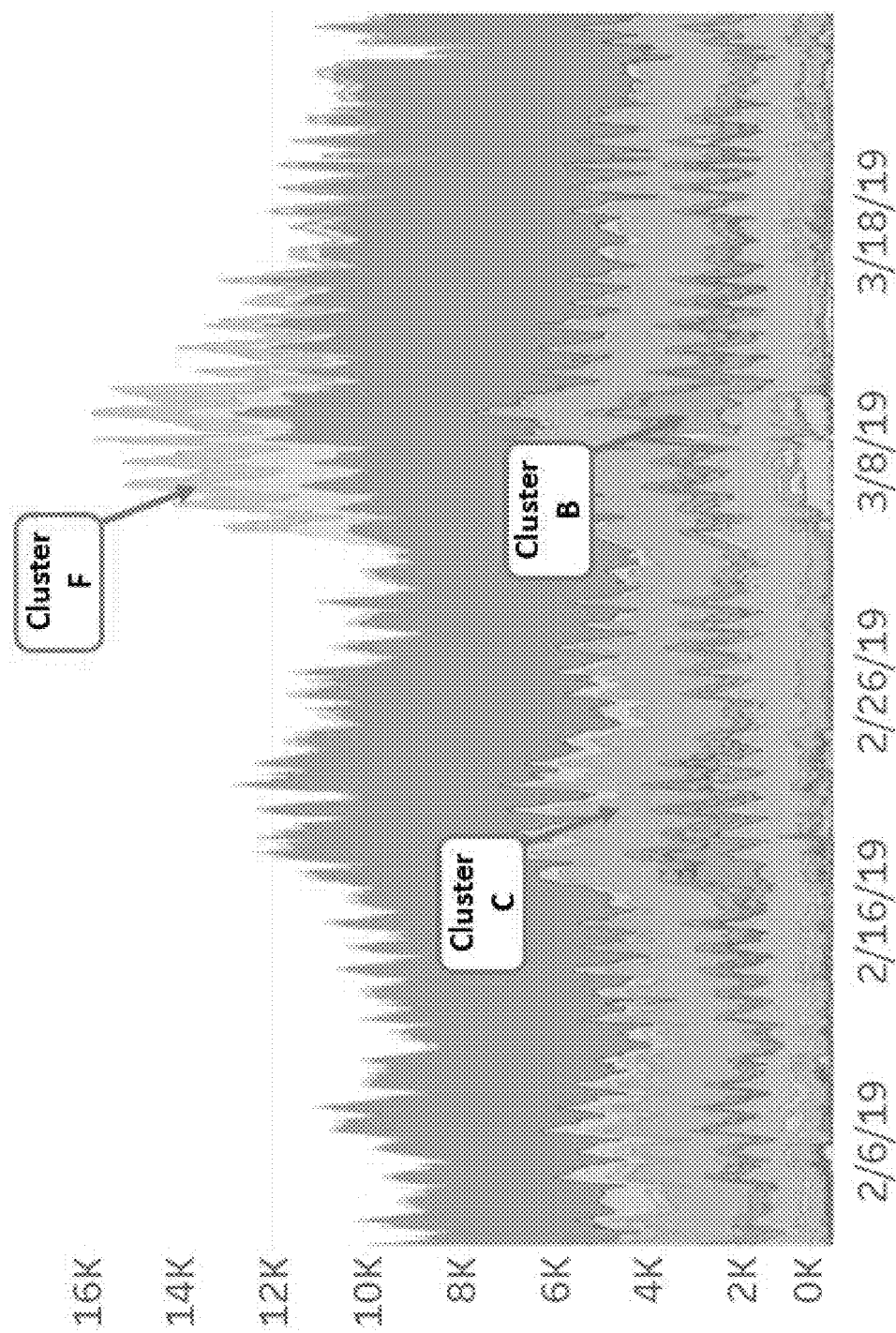
FIGS. 4A and 4B show an overview of the different clusters in the data during the data collection period, aggregated by hour.
Figure 4B:
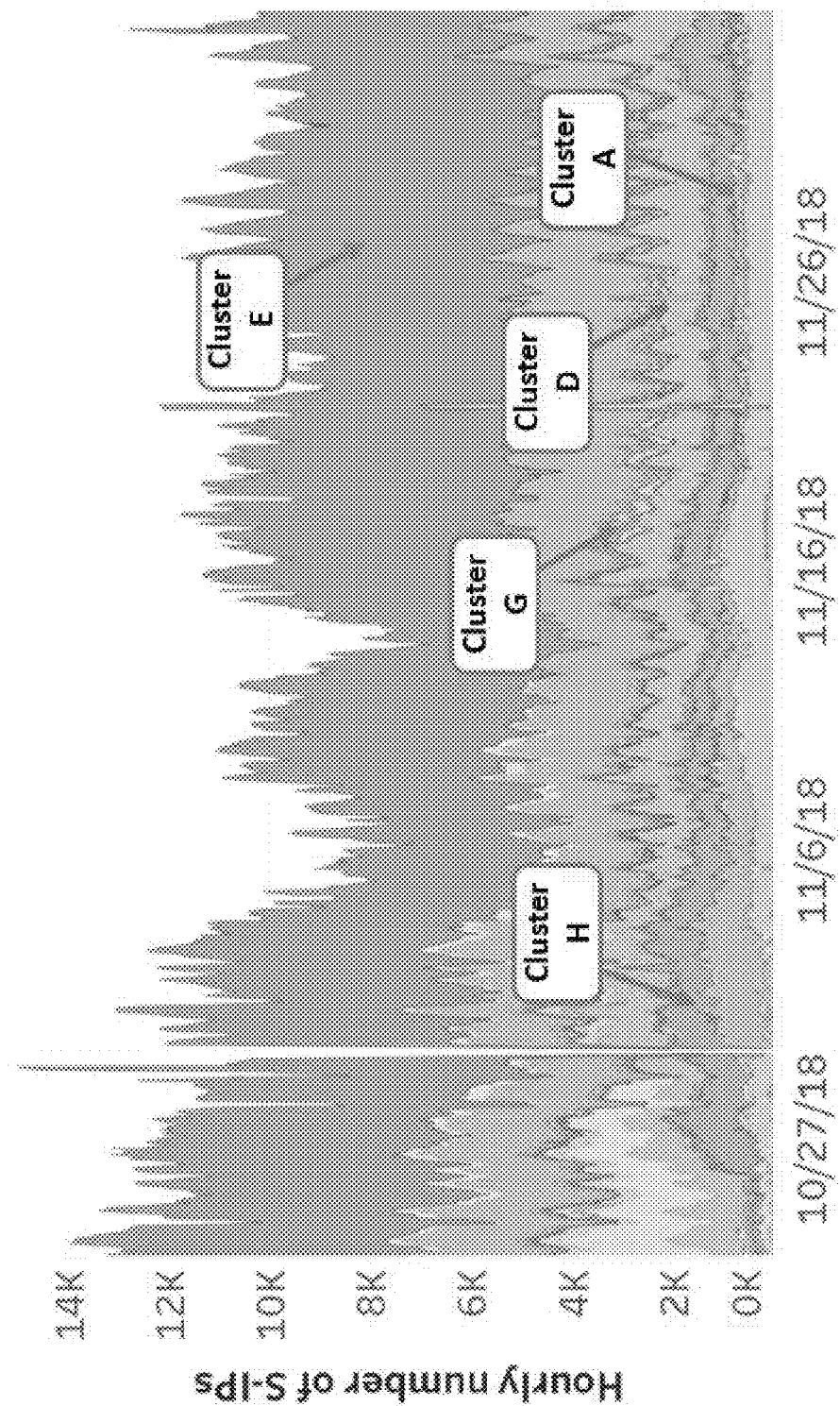
Figure 5:
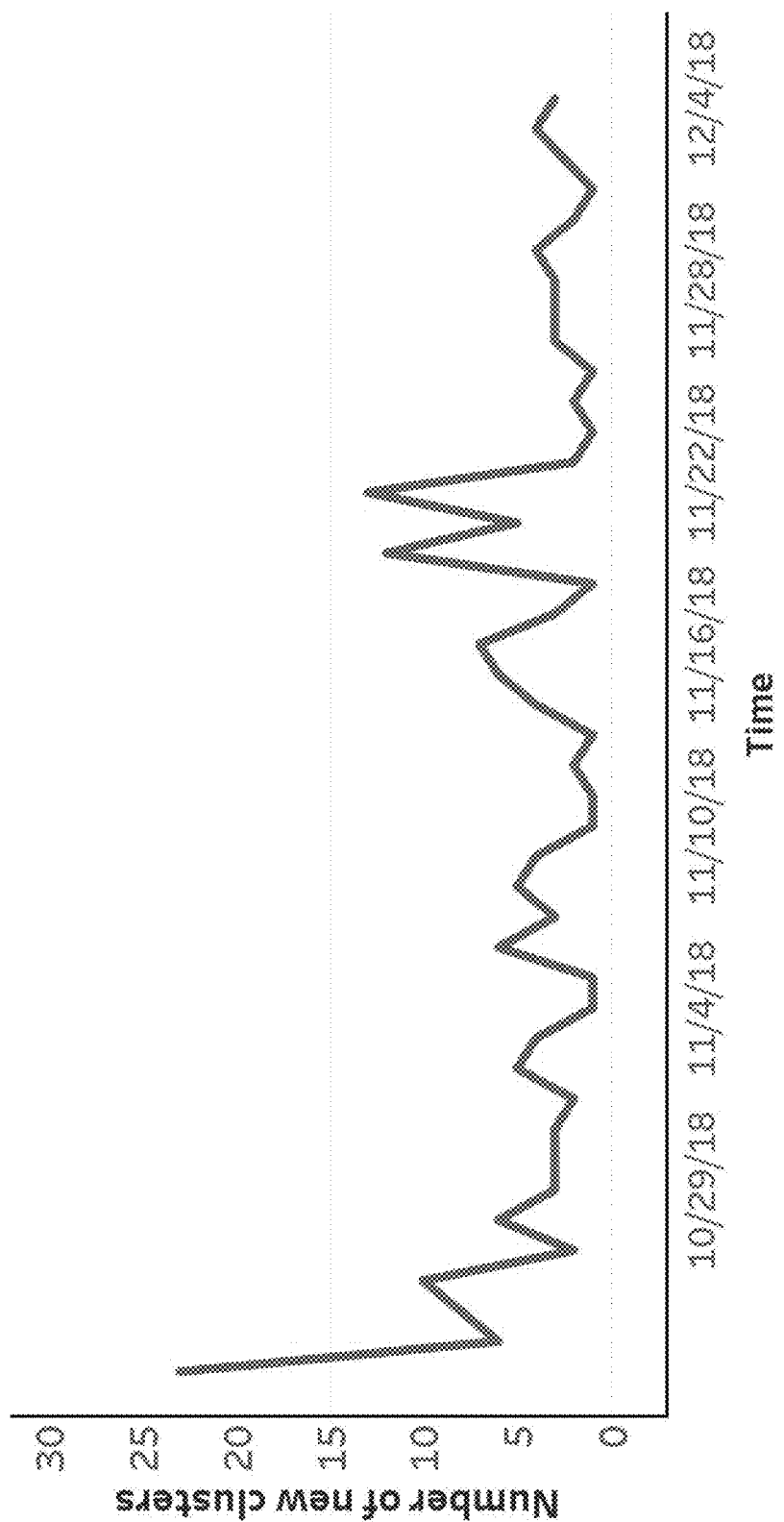
FIG. 5 shows the number of newly discovered clusters over time in Batch 1 data.

Using DANTE dramework, a total of 400 clusters was discovered over the 14 week period. As previously mentioned, the system discovered four new clusters each day, on average, as can be seen in FIG. 5. However, 24 clusters were discovered in the first time window of Batch 1, and 22 in Batch 2, as all of the clusters in the first time window are considered new. FIG. 4 presents an overview of the 400 clusters discovered in the analysis. The x-axis represents time, and the y-axis represents the total number of S-IPs in the data for each hour. This graph is updated at the end of each time window on an ongoing basis to help the analyst explore the current and past trends in the darknet data.

The vast majority of the S-IPs belongs to the largest 16 clusters which are relatively unchanged throughout the data collection period. Nevertheless, the majority of the clusters do change over time, either by changing in size or by disappearing and reappearing throughout the experiment.

It was found that the 400 clusters can be roughly categorized into four different families (see Table 1):

1. Port Scanning: Clusters that consist of five or more different ports.
2. Network Scanning: Clusters that consist of S-IPs trying to access a single destination port.
3. Multiple Port Sequence: Clusters with more than one port but less than five, which can indicate a complex attack pattern.
4. Noise and Outliers: This family consists of a single cluster, with patterns that belong to a misconfiguration or backscatters, or are too small to represent an ongoing trend.

Port Scanning

Port scanning clusters typically include a group of IPs that is trying to access five or more different ports. In the 14 weeks period, 51 port scanning clusters were identified with an average of 929 different ports scanned in each cluster. Usually port scanning is used by the attackers in order to find and exploit known backdoors or vulnerabilities of the services that the port is using [29]. However, it is important to note that a cluster in this group is not necessarily malicious. For example, one of the clusters, cluster A have S-IPs all from a subnet which belong to a security company whose goal is to scan 40 different ports to find IoT devices with known vulnerabilities and report them [17]. Nonetheless, 2.2% of the S IPs in cluster A do not belong to the security company and are known to be malicious, thus the DANTE can indicate that attackers are imitating the company's behavior and issue alerts about it.

In some cases, the port scanning can consist of multiple ports that belong to the same service, in order to use an exploit on this service even if the host is using an alternative port. For example, Cluster B, occurred on Mar. 8, 2019, consist only of ports that can be associated with HTTP. This cluster consists of 17 ports, such as 80, 8080, 8000, 8008, 8081 and 8181. In addition, most of the S-IPs are located in Taiwan (18%), Iran (15%) and Vietnam (12%). Because DANTE assigns similar embedding to those ports, those ports were grouped together and DANTE was able to detect this pattern and issue an alert. At the time of developing the present invention, it was impossible to find any information on this scan online. This lack of reports could be explained by the fact that there was no significant peak in any of the ports involved, which make it hard for conventional anomaly detectors to detect this pattern.

Network Scanning

Many of the port sequences in the data consist of a single port and thus mean that the sender is trying to access a single service, a method knows as a network Scanning [29]. Although those sequences do not reflect complex patterns, by inspecting their clusters over time it is possible to find trends and discover new vulnerabilities. The proposed framework allows an analyst to explore and analyze this type of pattern easily.

Figure 8:
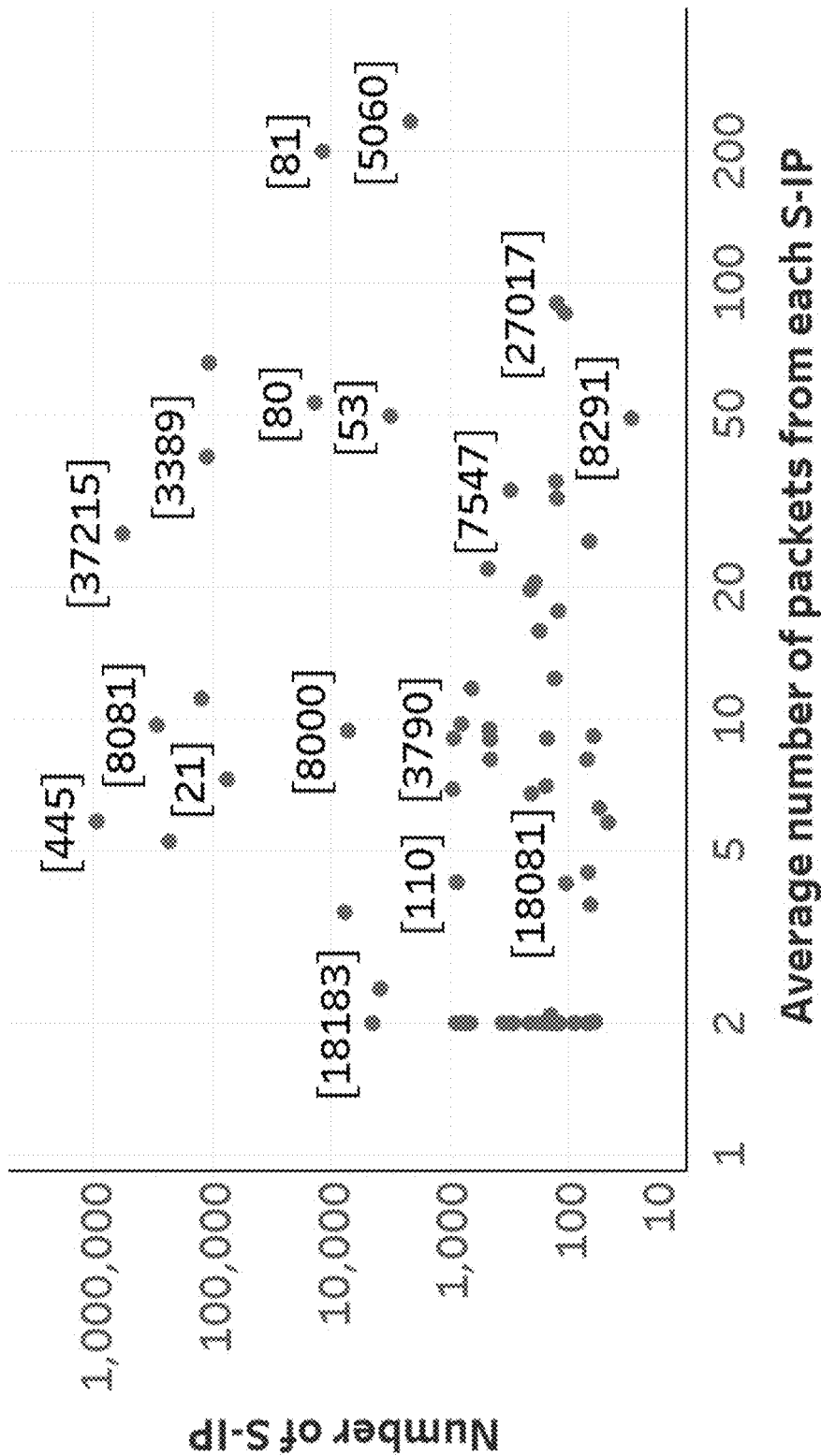
FIG. 8 shows a view of the network Scanning clusters from Batch 1 data.

For example, FIG. 8 contains a scatter plot of each port sequence cluster from Batch 1 and its corresponding port. It is interesting to see that, for example, port 445 is accessed by many S-IPs, each of which only accessed the port an average of 5.8 times. On the other hand, port 5060 is a much smaller cluster, however, in this cluster each S-IP in this cluster sent an average of 234.3 packets. An example of this type of cluster can be seen in the second largest cluster, C. This cluster regularly appears in each hour of the data and consists of port 445, which is reported to be connected with the Conficker worm [19, 27, 45]. Nonetheless, most of the clusters in this family are relatively small and only appear for a few hours. For example, between 1:00 and 6:00 AM GMT on Nov. 25, 2018, DANTE found a network scanning cluster, D, of the unused port 11390. This cluster consists of 895 different S-IPs which sent 68,065 packets. While 1,097 of our 1,129 monitored IPs received some number of packets in the cluster, 95% of the packets targeted one specific D-IP.

By using the distributed system, DANTE was able to issue an alert with that information about a minute after the data arrived.

Multiple Port Sequences

Figure 7A:
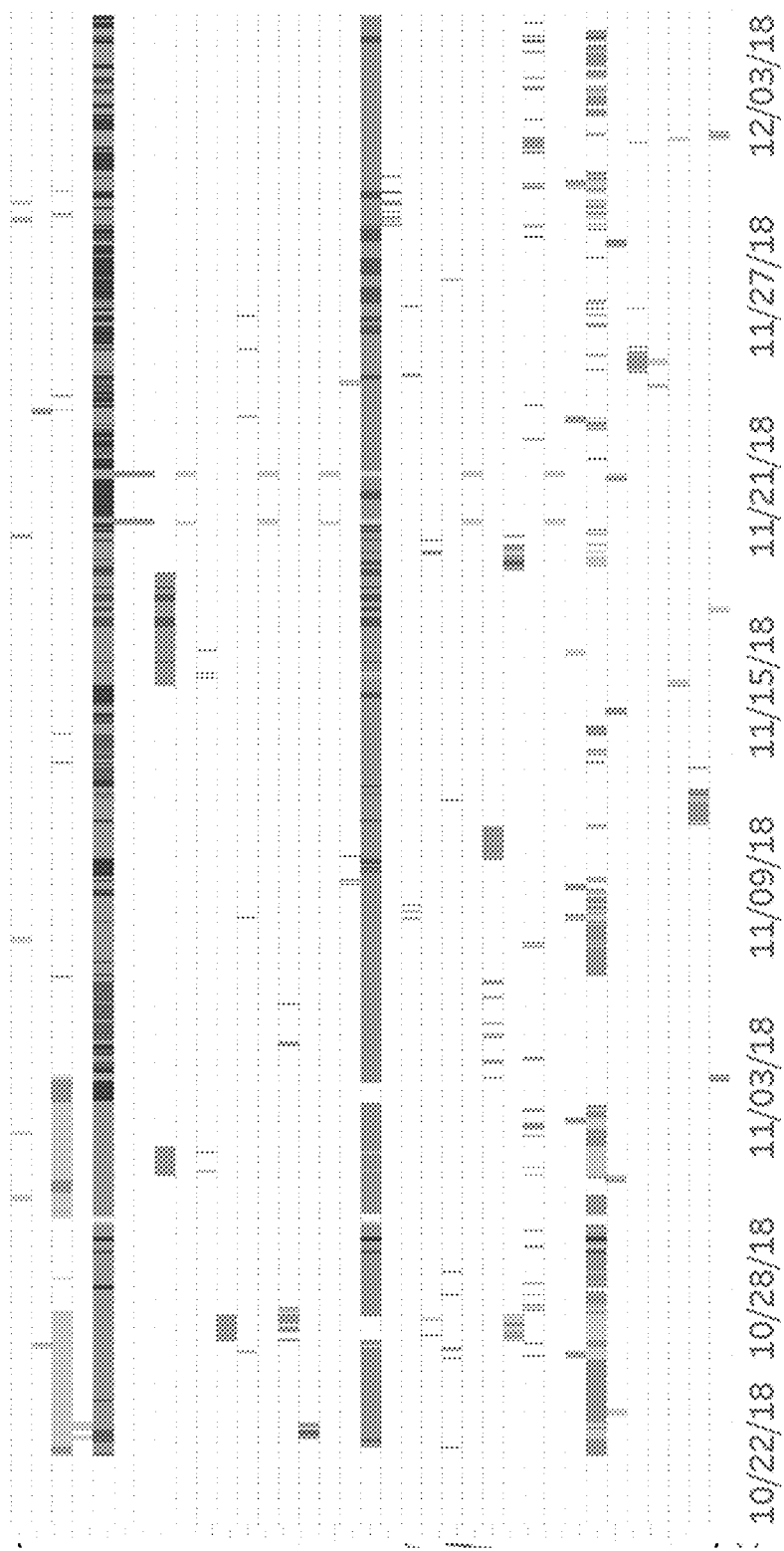
FIGS. 7A and 7B show a Gantt chart of cluster re-occurrence.
Figure 7B:
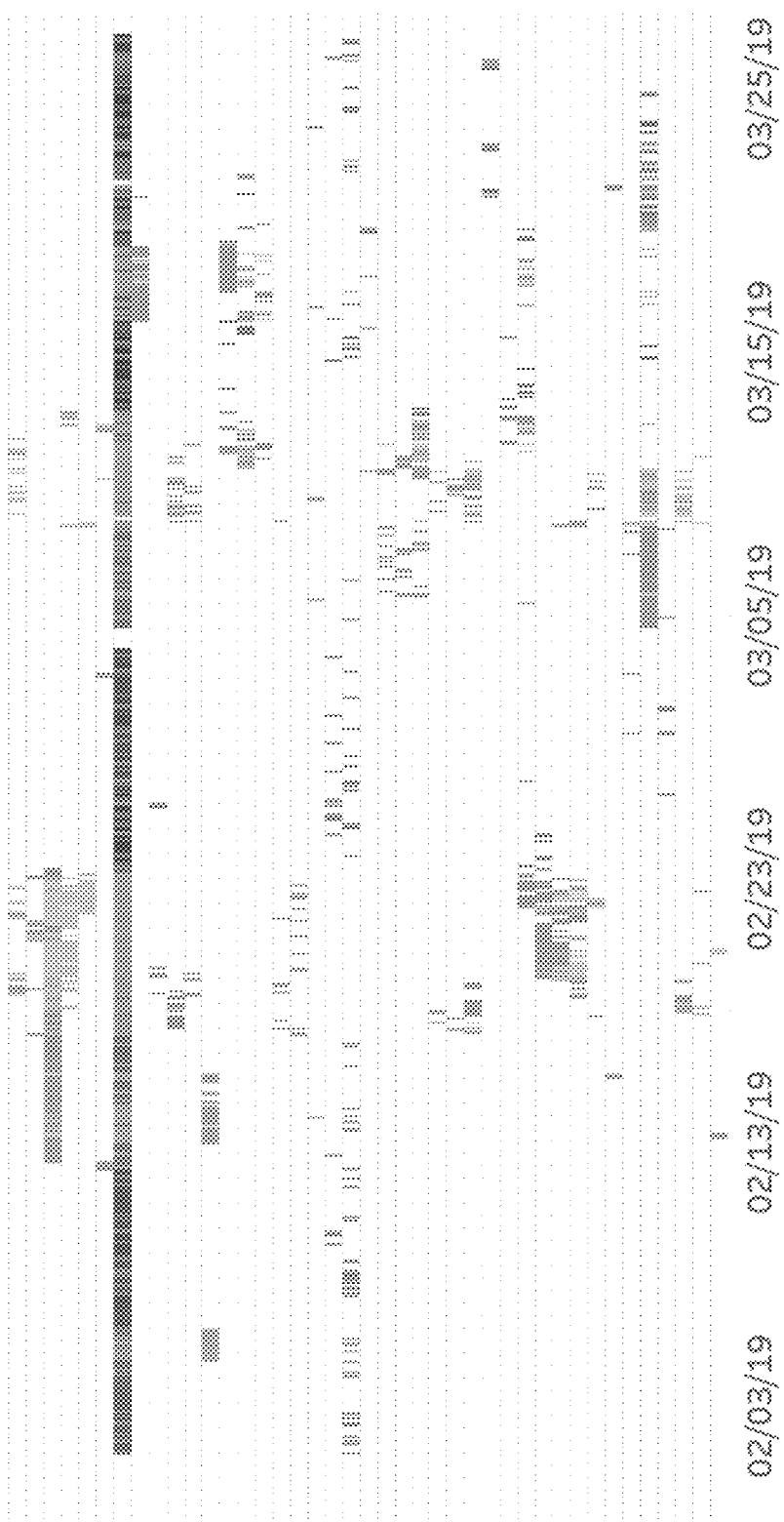

Novel attack patterns are most likely to be discovered in this family, as several backdoors and vulnerabilities in the same scan. Those patterns may go undetected by existing attack detection methods, either because of their use of a very small amount of S-IPs and ports, or because of their use of popular ports (such as port 23 or 445), in order to disguise the attacks as one of the patterns described in the previous families. In addition, 44.8% of the detected patterns reappeared on a later date (in some cases, one or two weeks later), sometimes with minor changes such as adding or removing some of the ports in the scan. FIG. 7 presents a Gantt chart of those reoccurring clusters. In the case of the reoccurring patterns, DANTE did not send an alert regarding a new attack pattern but did report a new occurrence of the known pattern. One example of this family can be seen in the largest pattern both by S-IPs and number of packets, cluster E. The S-IPs in cluster E use ports 23 and 2323 interchangeably. Both ports are used for Telnet, and they are connected with the Mirai botnet and are likely to appear in every darknet scanner from the last few years [27].

Figure 9:
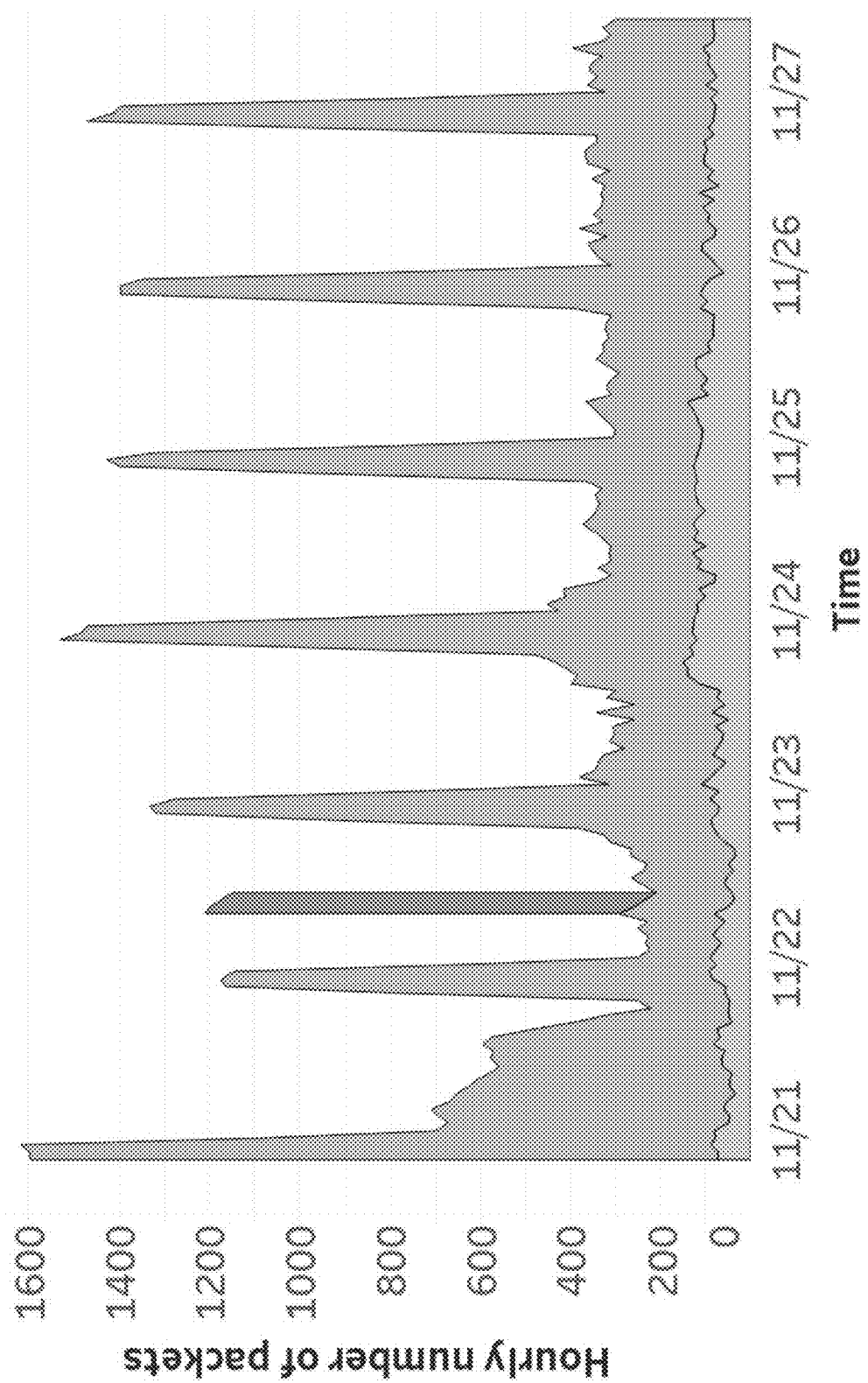
FIG. 9 presents the number of packets that arrived to port 7547 during the week of Nov. 21, 2018, where each color represents a different cluster.

Another example occurred on Mar. 4, 2019, where DANTE reported a new large cluster, consisting of two ports. This cluster, F, can be seen in FIG. 4. Cluster F consist of port 9527 and port 5555, where 92% of the S-IPs sends exactly three packets to port 9527, and 8% of the S-IP sends three packets to port 9527 and then three packets to port 5555 and vice versa. In addition, most of the S-IPs came from China and Brazil. Apparently, the first report of this attack happened only four days later [35], connecting port 9527 to a known vulnerability on IP-Cameras (CVE-2017-11632). This confirms that DANTE can detect actual attacks. Moreover, all of the reports found online, including the CVE, only mentioned port 9527. However, DANTE discovered that port 5555 is also part of this attack. A third example of this family can be seen in a cluster, G, from 11/22/18, which was discovered by DANTE. This cluster contains a pattern of scanning two specific ports, 7547 and 7550, which occurs on Nov. 22, 2018 from 5 to 9 PM GMT. According to the Internet Storm Center (ISC) port search [42], a free tool that monitors the level of malicious port activity, this is the most significant peak of activities for port 7550 in the past two years; however, there have been no reports of an attack that utilizes this port. The missing information in the reports could suggest a novel attack that utilizes those two ports. In addition, port 7547 appears to have a large number of packets arriving each day at 10:00 AM GMT that were assigned to a different cluster. Unlike cluster G, that cluster consists of port 7547 alone with no additional ports in the scan. Dec. 22, 2018 is the only day when activity on this port peaks in a different hour (see FIG. 9). There are reports [41] of a known Mirai botnet variant that uses port 7547 to exploit routers. Based on this report cluster F was attributed to Mirai activity. Since DANTE detected that the two ports are used interchangeably by the same S-IPs, there was a suspicion that there is a new vulnerability tested on port 7550 of routers. At the time of developing the present invention, existence or absence of such vulnerability was not yet confirmed by any organization. A fourth example occurred on Oct. 31, 2018 when an alert about a cluster, H, was issued a minute after the data arrived; there was a recurrence of this cluster each day from 11/15/18 until 11/18/18. Cluster H consists of three ports: 5379, 6379, and 7379. Each of the 1,789 different S-IPs in the cluster sent exactly four packets to two or three of said ports during said time periods. According to the ISC, this is the largest peak in the use of port 5379 and the third largest peak for port 7379, although these ports are considered unused. This pattern indicates significant irregular activity and thus should be further investigated.

TABLE 2

| Cluster Name | Family | Number of S-IPs | Number of Packets | Sequence Examples |
| --- | --- | --- | --- | --- |
| A | Port Scanning | 141 | 873,458 | [2077, 2077, 8877, 7080, . . . , 9304, 3556] |
| B | Port Scanning | 20,982 | 2,061,655 | [8000, 88, 80] |
| C | Network Scanning | 113,407 | 7,061,042 | [445, 445, 445] |
| D | Network Scanning | 895 | 68,065 | [11390, 11390, . . . , 11390, 11390] |
| E | Network Scanning | 285,651 | 42,225,387 | [23, 23, 2323] |
| F | Multiple Port Sequences | 43,305 | 1,718,440 | [9527, 9527, 9527, 5555, 5555, 5555] |
| G | Multiple Port Sequences | 43,305 | 105,258 | [7379, 7379, 5379, 5379, 6379, 6379] |

Table 2: The number of S-IPs, packets, and a sequence example for each of the mentioned clusters. defined as outliers. Those patterns are port sequences that are not large enough, in terms of the number of S-IPs, to become a new cluster. The rationale behind this is that most of the traffic in this family is backscatter or misconfigurations packets, and thus does not represent a scan [26, 29]. Although some of the patterns can represent a scan, those kinds of patterns cannot indicate a trend due to their small volume. The size of this cluster is directly controlled by the minPts parameter in DBScan and can be changed at any time. As previously mentioned, minPts has been chosen to be 30 in order to create a reasonable number of clusters per day for a security expert to explore.

Although the examples above illustrate clustering by using DBScan algorithm, it should be noted that the method and system proposed by the present invention can use other clustering algorithms with similar results and efficiency.

Although the examples above illustrate a framework that collects and analyzes data from a darknet, it should be noted that the method and system proposed by the present invention can analyzing data traffic collected by honeypots, with similar efficiency.

The above examples and description have of course been provided only for the purpose of illustrations, and are not intended to limit the invention in any way. As will be appreciated by the skilled person, the invention can be carried out in a great variety of ways, employing more than one technique from those described above, all without exceeding the scope of the invention.

REFERENCES

[1] Bailey, M., Cooke, E., Jahanian, F., Myrick, A., & Sinha, S. (2006). Practical darknet measurement. In 2006 40th Annual Conference on Information Sciences and Systems. IEEE, 1496-1501.

[2] Bailey, M., Cooke, E., Jahanian, F., Nazarko, J., Watson, D., et al. (2005). The internet motion sensor-a distributed blackhole monitoring system. In NDSS.

[3] Ban, T., Eto, M., Guo, S., Inoue, D., Nakao, K., & Huang, R. (2015). A study on association rule mining of darknet big data. In 2015 International Joint Conference on Neural Networks (IJCNN). ISSN 2161-4407, 1-7. doi:10.1109/IJCNN. 2015.7280818.

[4] Ban, T., Pang, S., Eto, M., Inoue, D., Nakao, K., & Hoang, R. (2016). Towards early detection of novel attack patterns through the lens of a large-scale darknet. In 2016 Intl IEEE Conferences on Ubiquitous Intelligence Computing, Advanced and Trusted Computing, Scalable Computing and Communications, Cloud and Big Data Computing, Internet of People, and Smart World Congress (UIC/ATC/ScalCom/CBDCom/IoP/SmartWorld). 341-349.

[5] Ban, T., Zhu, L., Shimamura, J., Pang, S., Inoue, D., & Nakao, K. (2012). Behavior analysis of long-term cyber attacks in the darknet. In International Conference on Neural Information Processing. Springer, 620-628.

[6] Ban, T., Zhu, L., Shimamura, J., Pang, S., Inoue, D., & Naka, K. (2017). Detection of botnet activities through the lens of a large-scale darknet. In Neural Information Processing. Springer International Publishing, Chain. ISBN 978-3-319-70139-4, 442-451.

[7] Bartos, K., Sofka, M., & Franc, V. (2016). Optimized Invariant Representation of Network Traffic for Detecting Unseen Malware Variants. ISBN 978-1-931971-32-4.

[8] Bou-Harb, E., Debbabi, M., & Assi, C. (2015). A Time Series Approach for Inferring Orchestrated Probing Campaigns by Analyzing Darknet Traffic. In 2015 10th International Conference on Availability, Reliability and Security. IEEE. ISBN 978-1-4673-6590-1, 180-185. doi: 10.1109/ARES.2015.9.

[9] Bringer, M. L., Chelaecki, C. A., & Fujinoki, H. (2012). A survey: Recent advances and future trends in honeypot research. International Journal of Computer Network and Information Security, 4(10), 63.

[10] Cao, F., Estert, M., Qian, W., & Zhou, A. (2006). Density-based clustering over an evolving data stream with noise. In Proceedings of the 2006 SIAM international conference on data mining. SIAM, 328-339.

[11] Carnein, M. & Trautmann, H. (2019). Optimizing data stream representation: An extensive survey on stream clustering algorithms. Business & Information Systems Engineering. ISSN 1867-0202. doi:10.1007/s12599-019-00576-5.

[12] Casas, P., Manel, J., & Owezarski, P. (2012). Unsupervised Network Intrusion Detection Systems: Detecting the Unknown without Knowledge. Computer Communications, 35, 772-783. doi:10.1016/j.comcom.2012.01.016.

[13] Choi, S.-s., Song, J., Kim, S., & Kim, S. (2013). A model of analyzing cyber threats trend and tracing potential attackers based on darknet traffic. Security and Communication Networks, 7(10), n/a-n/a. ISSN 19390114. doi:10.1002/sec.796.

[14] Clark, D. D. & Landau, S. (2010). The problem isn't attribution: it's multi-stage attacks. In Proceedings of the Re-architecting the Internet Workshop. ACM, 11.

[15] Corchado, E. & Herrero, Á. (2010). Neural visualization of network traffic data for intrusion detection. Applied Soft Computing Journal, 11, 2042-2056. doi: 10.1016/j.asoc.2010.07.002.

[16] Coudriau, M., Lahmadi, A., & Franeois, J. (2016). Topological analysis and visualisation of network monitoring data: Darknet case study. In 2016 IEEE International Workshop on Information Forensics and Security (WIFS). ISSN 2157-4774, 1-6. doi:10.1109/WIFS.2016.7823920.

[17] Durumeric, Z., Adrian, D., Mirian, A., Bailey, M., & Halderman, J. A. (2015). A search engine backed by internet-wide scanning. In Proceedings of the 22nd ACM SIGSAC Conference on Computer and Communications Security. ACM, 542-553.

[18] Durumeric, Z., Bailey, M., & Halderman, J. A. (2014). An internet-wide view of internet-wide scanning. In 23rd {USENIX} Security Symposium ({USENIX} Security 14). 65-78.

[19] Darusmeric, Z., Bailey, M., & Halderman, J. A. (2014). An internet-wide view of internet-wide scanning. In Proceedings of the 23rd USENIX Conference on Security Symposium, SEC'14. USENIX Association, Berkeley, Calif., USA. ISBN 978-1-931971-15-7, 65-78.

[20] Ester, M., Kriegel, H.-P., Sander, J., Wimmer, M., & Xu, X. (1998). Incremental clustering for mining in a data warehousing environment. In VLDB, volume 98. Citesecr, 323-333.

[21] Ester, M., Kriegel, H.-P., Sander, J., Xu, X., et al. (1996). A density-based algorithm for discovering clusters in large spatial databases with noise. In Kdd, volume 96.226-231.

[22] Fachkha, C., Bou-Harb, E., & Debbabi, M. (2015). Inferring distributed reflection denial of service attacks from darknet. Computer Communications, 62, 59-71. ISSN 0140-3664. doi:10.1016/J.COMCOM.2015.01.016.

[23] Faria, E. R., Gonealves, I. J., de Carvalho, A. C., & Gama, J. (2016). Novelty detection in data streams. Artificial Intelligence Review, 45(2), 235-269.

[24] Furutani, N., Ban, T., Nakazato, J., Shimamura, J., Kita-uono, J., & Ozawa, S. (2014). Detection of DDoS Backscatter Based on Traffic Features of Darknet TCP Packets. In 2014 Ninth Asia Joint Conference on Information Security. IEEE.ISBN 978-1-4799-5733-0, 39-43. doi:10.1109/AsiaJCIS.2014.23.

[25] Guha, S., Mishra, N., Motwani, R., & O'Cagaghan, L. (2000). Clustering data streams. In Foundations of computer science, 2000. proceedings. 41st annual symposium on. IEEE, 359-366.

[26] Harrop, W. & Armitage, G. (2005). Defining and evaluating greynets (sparse darknets). In The IEEE Conference on Local Computer Networks 30th Anniversary (LCN'05) 1. IEEE, 344-350.

[27] Heo, H. & Shin, S. (2018). Who is knocking on the telnet port: A large-scale empirical study of network scanning. In Proceedings of the 2018 on Asia Conference on Computer and Communications Security. ACM, 625-636.

[28] Lagraa, S., Francois, J., Lohmadi, A., Miner, M., Hammer-schmidt, C., & State, R. (2017). BotGM: Unsupervised graph mining to detect botnets in traffic flows. In 2017 1st Cyber Security in Networking Conference (CS-Net). IEEE. ISBN 978-1-5386-1332-0, 1-8. doi:10.1109/CSNET.2017.8241990.

[29] Liu, J. & Fukuda, K. (2014). Towards a taxonomy of darknet traffic. In 2014 International Wireless Communications and Mobile Computing Conference (IWCMC). IEEE. ISBN 978-1-4799-0959-9, 37-43. doi:10.1109/IWCMC.2014.6906329.

[30] Maaten, L. v. d. & Hinton, G. (2008). Visualizing data using t-sne. Journal of machine learning research, 9(November), 2579-2605.

[31] Mairb, A., Barik, D., Vermna, K., & Jena, D. (2011). Honeypot in network security: a survey. In Proceedings of the 2011 international conference on communication, computing & security. ACM, 600-605.

[32] Mlov, T., Chem, K., Corrado, G., & Dean, J. (2013). Efficient estimation of word representations in vector space. CoRR, abs/1301.3781.

[33] Mizoguchi, S., Fukushima, Y., Kasahara, Y., Hori, Y., & Sakurai, K. (2010). Darknet monitoring on real-operated networks. In 2010 International Conference on Broadband, Wireless Computing, Communication and Applications. IEEE, 278-285.

[34] Nakao, K., Inoue, D., Eto, M., & Yoshioka, K. (2009). INVITED PAPER Special Section on Information and Communication System Security Practical Correlation Analysis between Scan and Malware Profiles against Zero-Day Attacks Based on Darknet Monitoring. (5). doi:10.1587/mnsinf.E92.D.787.

[35] Nichols, S. (2019). Fbi warns of sim-swap scams, ibm finds holes in visitor software, 13-year-old girl charged over javascript prank. https//www.theregister.co.uk/2019/03/09/security_roundup_080319/.

[36] Owesarski, P. (2015). A Near Real-Time Algorithm for Autonomous Identification and Characterization of Honeypot Attacks. Technical report.

[37] Pa, Y. M. P., Sazuki, S., Yoshioka, K., Matsumoto, T., Kasama, T., & Rossow, C. (2016). Iotpot: A novel honeypot for revealing current iot threats. Journal of Information Processing, 24(3), 522-533. doi:10.2197/ipsjjip.24.522.

[38] Pang. S., Komosny, D., Lei Zhu, Zhang, R., SarrafEadeh, A., Tao Dan, & DaLmske Inoue. Malicious Events Grouping via Behavior Based Darknet Traffic Flow Analysis. Wireless Personal Communications, 96. doi:10.1007/s1277-016-3744-4.

[39] Slaghal, A. & Ou, X. (2017). Security risk analysis of enterprise networks using probabilistic attack graphs. In Network Security Metrics. Springer, 53-73.

[40] Thonnard, O. & Dacier, M. (2008). A framework for attack patterns' discovery in honeynet data. digital investigation. 5. S128-S139.

[41] Ullrich, J. (2016). Port 7547 soap remote code execution attack against dsl modems. https://isc.sans.edu/diary/Port+7547+SOAP+Remote+Code+Execution+Atack+Against+DSL+Modems/21759.

[42] Van Horenbeeck, M. (2008). The sans internet storm center. In 2008 WOMBAT Workshop on Information Security Threats Data Collection and Sharing. IEEE, 17-23.

[43] Waper, C., Dulaunoy, A., Wagner, G., & Iklody, A. (2016). Misp: The design and implementation of a collaborative threat intelligence sharing platform. In Proceedings of the 2016 ACM on Workshop on Information Sharing and Collaborative Security. ACM, 49-56.

[44] Wieting, J., Bansal, M., Gimpel, K., & Livescu, K. (2015). Towards universal paraphrastic sentence embeddings. arXiv preprint arXiv:1511.08198.

[45] Wostrow, E., Karir, M., Bailey, M., Jahanian, F., & Huston, G. (2010). Internet background radiation revisited. In Proceedings of the 10th ACM SIGCOMM Conference on Internet Measurement, IMC '10. ACM, New York, N.Y., USA. ISBN 978-1-4503-0483-2, 62-74. doi: 10.1145/1879141.1879149.

[46] Zhang, J., Tong, Y., & Qiu, T. (2016). Traffic Features Extraction and Clustering Analysis for Abnormal Behavior Detection. doi:10.1145/3028842.3028867.

[47] Škrjanc, L., Ozawa, S., Dovian, D., Tao, B., Nakazato, J., & Shimamura, J. (2017). Evolving cauchy possbilistic clustering and its application to large-scale cyberattack monitoring. In 2017 IEEE Symposium Series on Computational Intelligence (SSCI). 1-7. doi:10.1109/SSCI.2017.8285203.

The invention claimed is:

1. A method for analyzing and clustering darknet traffic streams with word embeddings, comprising:
    a) collecting data from blackhole taps of said darknet, being unassigned IP addresses;
    b) splitting the collected data into sliding time windows, each having a predetermined length;
    c) For each time window, grouping the destination port (D-port) records of the same source IP (S-IP) into a port sequence, to obtain a plurality of port sequences;
    d) transforming said port sequences into a numerical feature vectors by applying a word embedding algorithm to said port sequences, by treating ports as words and port sequences as sentences;
    e) clustering said feature vectors over time by performing temporal clustering; and
    f) upon identifying clusters that have been appeared and classified as malicious in the past or clusters that have never seen before, issuing an alert.

2. A method according to claim 1, wherein temporal clustering is parallelized over a big data cluster while receiving data from multiple sources.

3. A method according to claim 1, wherein the word embedding algorithm is Word2vec.

4. A method according to claim 1, wherein temporal clustering is performed by examining the D-Ports of packets arriving to the darknet, such that IPs with similar D-ports activities, both in terms of time and ports numbers, create a pattern that represent a new attack.

5. A method according to claim 3, wherein a sequence from a specific S-IP corresponds to a sentence, and the port numbers correspond to the words in said sentence.

6. A method according to claim 1, further comprising summarizing sequences of ports as their average embedding and analyzing their behavior by performing cluster analysis and inspecting said clusters over time.

7. A method according to claim 1, wherein splitting the collected data into sliding time windows is performed by sorting and aggregating the most recent data into overlapping time windows, such that there will be overlap between neighboring, in order to track clusters.

8. A method according to claim 1, wherein clustering is applied to the data of each time window using DBSCAN.

9. A method according to claim 1, wherein clustering is applied to the data of each time window using DBSCAN.

10. A method according to claim 1, wherein categories of clusters are selected from the group of:
    Port Scanning Clusters that consist of five or more different ports;
    Network Scanning Clusters that consist of S-IPs trying to access a single destination port;
    Multiple Port Sequence being Clusters with more than one port but less than five, which can indicate a complex attack pattern;
    Noise and Outliers being a single cluster, with patterns that belong to a misconfiguration or backscatters, or are too small to represent an ongoing trend.

11. A method according to claim 1, wherein the darknet is implemented by a collection of honeypots that are deployed over that data network.

\* \* \* \* \*

UNITED STATES PATENT AND TRADEMARK OFFICE
CERTIFICATE OF CORRECTION

PATENT NO. : 11,695,794 B2
APPLICATION NO. : 16/838136
DATED : July 4, 2023
INVENTOR(S) : Dvir Cohen et al.

It is certified that error appears in the above-identified patent and that said Letters Patent is hereby corrected as shown below:

In the Specification

In Column 14, Lines 33 through 35 read: "Table 2: The number of S-IPs, packets and a sequence example for each of the mentioned clusters. defined as outliers," but the lines should read "Table 2: The number of S-IPs, packets and a sequence example for each of the mentioned clusters. This family consisting of a single cluster, with the patterns that the DBScan algorithm defined as outliers."

In Column 15, Line 1 reads: "[2] Bailey, M., Cooke, E., Jahanian, F. Nazarko, J., Watson," but it should read: "[2] Bailey, M. Cooke, E., Jahanian, F., Nazario, J.,..."

In Column 15, Line 10 reads: "Hoang, R. (2016). Towards early detection of novel attack..." but it should read: "Huang, R. (2016). Towards early detection of novel attack..."

In Column 15, Line 23 reads: "Naka, K. (2017). Detection of botnet activities through..." but it should read: "Nakao, K. (2017). Detection of botnet activities through..."

In Column 15, Line 36 reads: "[9] Bringer, M.L., Chelaecki, C.A., & Fujinoki, H. (2012)." but it should read: "[9] Bringer, M.L., Chelmecki, C.A.,& Fujinoki, H. (2012)."

In Column 15, Line 49 reads: "[12] Casas, P., Manel, J. & Owezarski, P. (2012). Unsupervised..." but it should read: "[12] Casas, P., Mazel, J., & Owezarski, P. (2012). Unsupervised..."

In Column 15, Line 66 reads: "[16] Coudriau, M., Lahmadi, A., & Franeois, J. (2016)." but it should read "[16] Coudriau, M., Lahmadi, A., & François, J. (2016)."

In Column 16, Line 14 reads: "[19] Darusmeric, Z., Bailey, M., & Halderman, J. A. (2014)." but it should read "[19] Durumeric, Z., Bailey, M., & Halderman, J. A. (2014)."

In Column 16, Line 32 reads: "[23] Faria, E. R., Gonçalves, I. J., de Carvalho, A. C., &" but it should read: "[23] Faria, E. R., Gonçalves, I. J., de Carvalho, A. C.,..."

Signed and Sealed this
Third Day of October, 2023

Katherine Kelly Vidal
*Director of the United States Patent and Trademark Office*

CERTIFICATE OF CORRECTION (continued)
U.S. Pat. No. 11,695,794 B2

In Column 16, Line 36 reads: "Kita-uono, J., & Ozawa, S. (2014). Detection of DDoS..." but it should read: "Kita-zono, J., & Ozawa, S. (2014). Detection of DDoS..."

In Column 16, Line 41 reads: "[25] Guha, S., Mishra, N., Motwani, R., & O'Cagaghan, L." but it should read: "[25] Guha, S., Mishra, N., Motwani, R., & O'Callaghan, L."

In Column 16, Line 54 reads: "[28] Lagraa, S., Francois, J., Lohmadi, A., Miner, M.," but it should read: "[28] Lagraa, S., Francois, J., Lahmadi, A., Miner, M.,..."

In Column 17, Line 1 reads: "[31] Mairb, A., Barik, D., Vemna, K., & Jena, D. (2011)." but it should read: "[31] Mairh, A., Barik, D., Verma, K., & Jena, D. (2011)."

In Column 17, Line 5 reads: "[32] Mlov, T., Chem, K., Corrado, G., & Dean, J. (2013)." but it should read: "[32] Mikolov, T., Chen, K., Corrado, G., & Dean, J. (2013).

In Column 17, Lines 32 and 33 read: "[38] Pang, S., Komosny, D., Lei Zhu, Zhang, R., SarrafEadeh, A., Tao Dan, & Dalmske Inoue. Malicious..." but they should read: "[38] Pang, S., Komosny, D., Lei Zhu, Zhang, R., Sarrafzadeh, A., Tao Ban, & Daisuke Inoue. Malicious..."

In Column 17, Line 37 reads: "[39] Slaghal, A. & Ou, X. (2017). Security risk analysis of..." but it should read: "[39] Singhal, A. & Ou, X. (2017). Security risk analysis of..."

In Column 17, Line 51 reads: "[43] Waper, C., Dulaunoy, A., Wagner, G., & Iklody, A." but it should read: "[43] Wagner, C., Dulaunoy, A., Wagener, G., & Iklody, A."

In Column 17, Line 59 reads: "[45] Wostrow, E., Karir, M., Bailey, M., Jahanian, F., &" but it should read: "[45] Wustrow, E., Karir, M., Bailey, M., Jahanian, F.,..."

In Column 17, Row 65 reads: "[46] Zhang, J., Tong, Y., & Qiu, T. (2016). Traffic Features..." but it should read: "[46] Zhang, J., Tong, Y., & Qin, T. (2016). Traffic Features..."

In Column 18, Row 1 reads: "[47] Skrjanc, L., Ozawa, S., Dovian, D., Tao, B., Nakazato," but it should read: "[47] Škrjanc, I., Ozawa, S., Dovžan, D., Tao, B., ..."